June 6, 1961    H. W. BERRY    2,987,622
INFRARED RECEIVER
Filed Feb. 23, 1954    5 Sheets-Sheet 1

INVENTOR.
HENRY W. BERRY
BY
Attorneys

INVENTOR.
HENRY W. BERRY

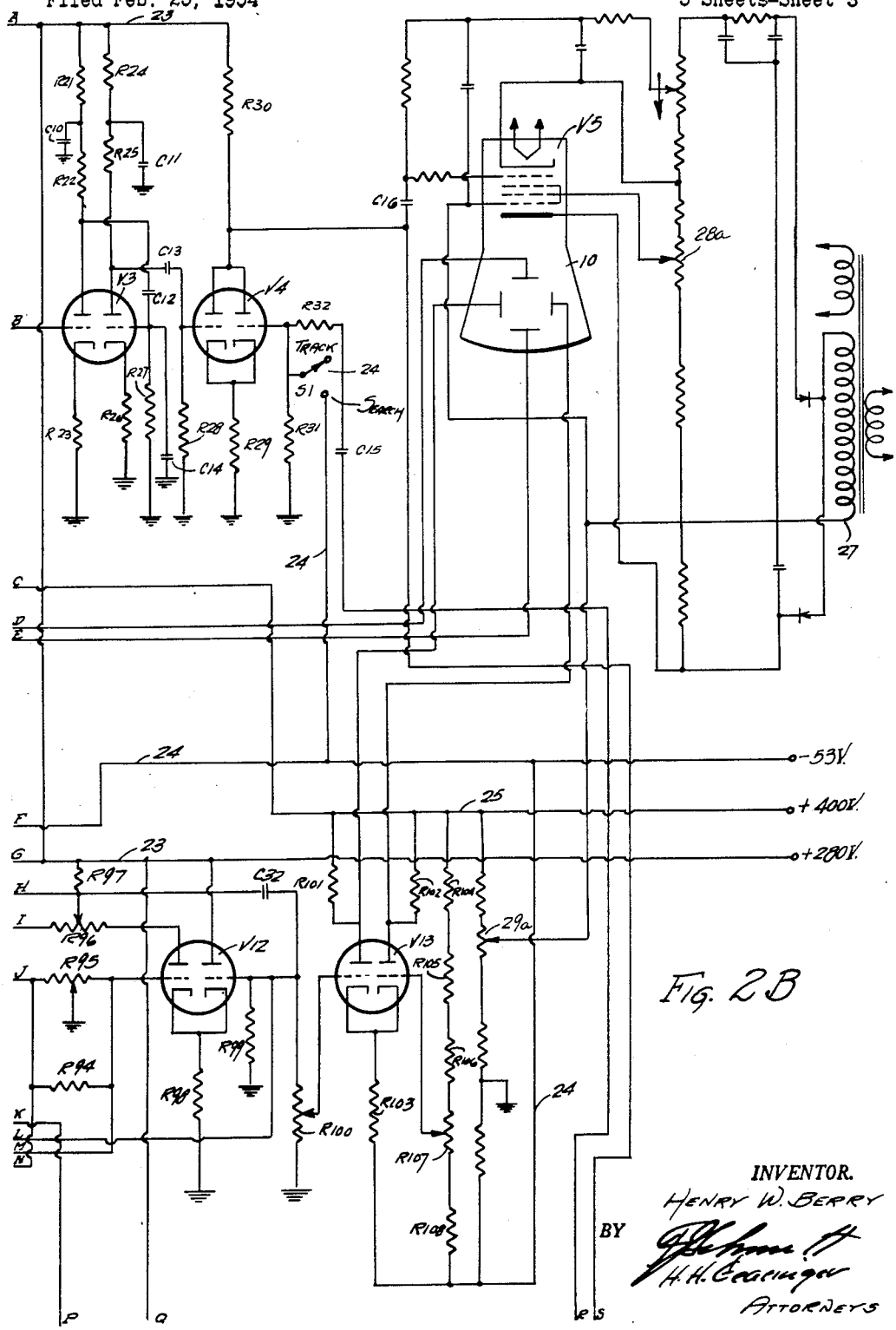

June 6, 1961  H. W. BERRY  2,987,622
INFRARED RECEIVER
Filed Feb. 23, 1954  5 Sheets-Sheet 4

INVENTOR.
HENRY W. BERRY
BY

Attorneys ated June 6, 1961

United States Patent Office

2,987,622
INFRARED RECEIVER
Henry W. Berry, Roseville, Minn., assignor, by mesne assignments, to the United States of America as represented by the Secretary of the Navy
Filed Feb. 23, 1954, Ser. No. 412,134
8 Claims. (Cl. 250—83.3)

The present invention relates to an infra-red energy scanning and detecting system and more particularly to novel and improved electrical circuits for controlling the movements of the optical components of such a system whereby a distant moving object or target which radiates infrared energy or the like may be located and tracked on suitable detection apparatus.

In systems of this type the natural temperature difference between target or object and the surrounding space is relied upon to produce thermal radiations such as infra red heat rays or the like. These radiations are received and collected by a suitable optical lens assembly or the like which will be described more fully hereinafter. The radiations are then used to first indicate the presence of the target within a predetermined area and thereafter to continuously follow or track that target as it changes its position therein.

It is a principal object of the present invention to provide a novel and improved apparatus for controlling the movements of the optical lens assembly such that it will properly search out and track a target, within a predetermined area.

It is a further object of the present invention to provide a novel and improved electrical circuit for searching a predetermined angular sector in elevation for an object or target.

Another object of the present invention is to provide a novel and improved electrical circuit for following or tracking the elevational movements of a preselected target.

A still further object of the present invention is to provide a novel and improved electrical circuit for following or tracking the changes in azimuth of a preselected object or target.

It is a still further object of the present invention to provide novel and improved electrical circuits for continuously indicating the precise position of an object or target from the electrical impulses and/or data which is provided by suitable searching and tracking circuits.

Figure 1:
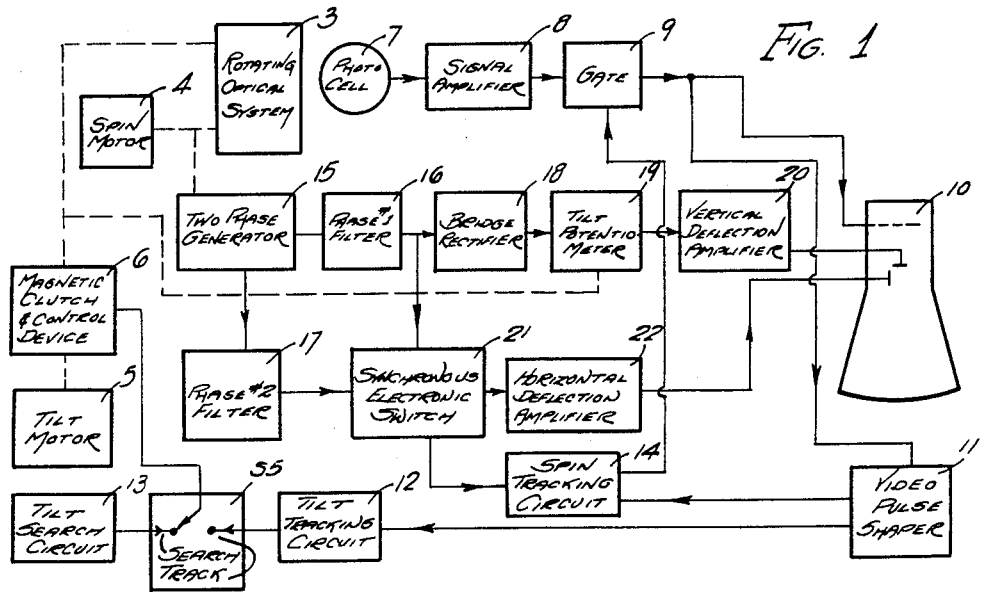

Other objects and many of the attendant advantages of this invention will be readily appreciated as the same becomes better understood by reference to the following detailed description when considered in connection with the accompanying drawings wherein:

FIGURE 1 is a block diagram of a preferred embodiment of the present invention.

Figure 2A:
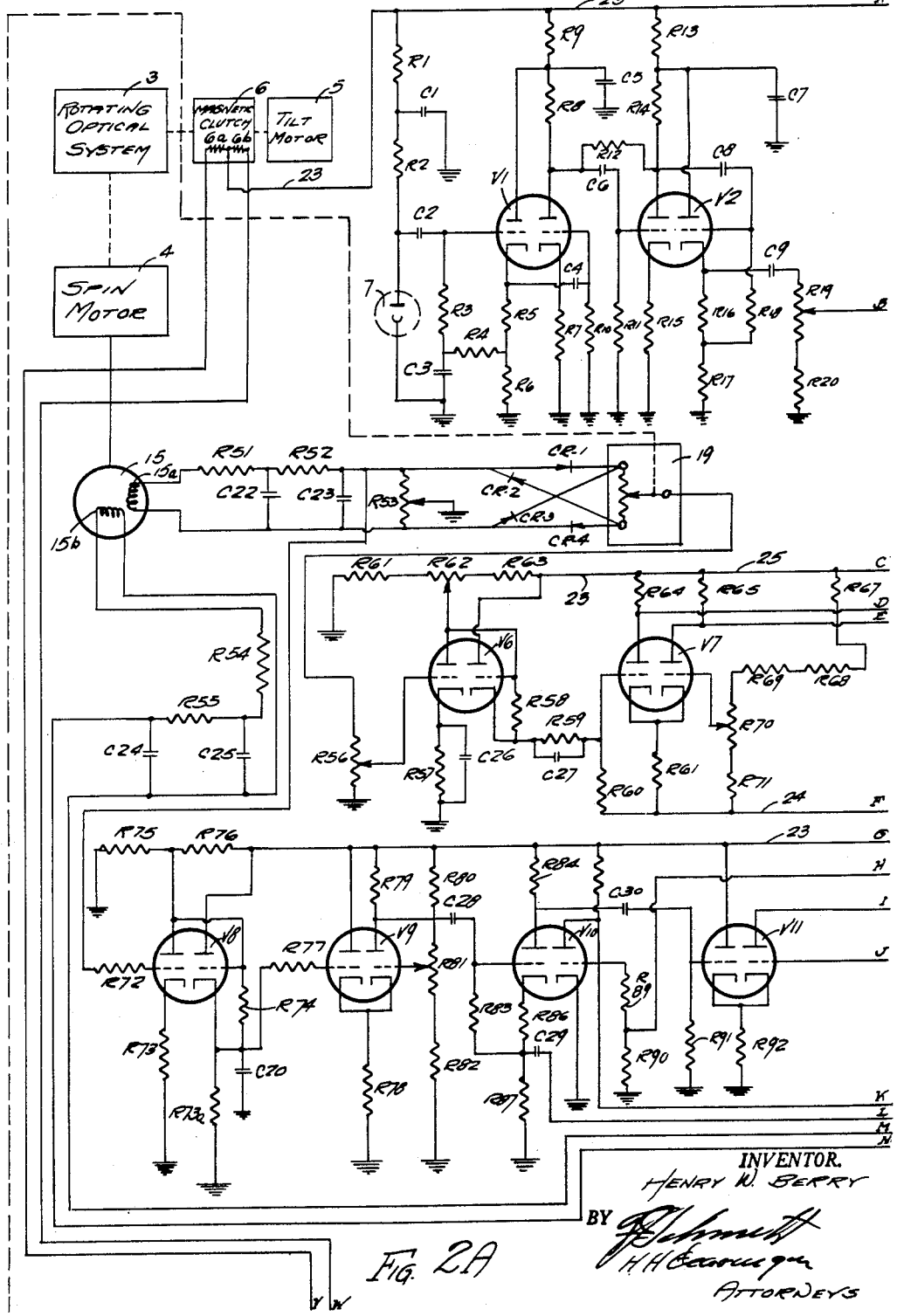
Figure 2C:
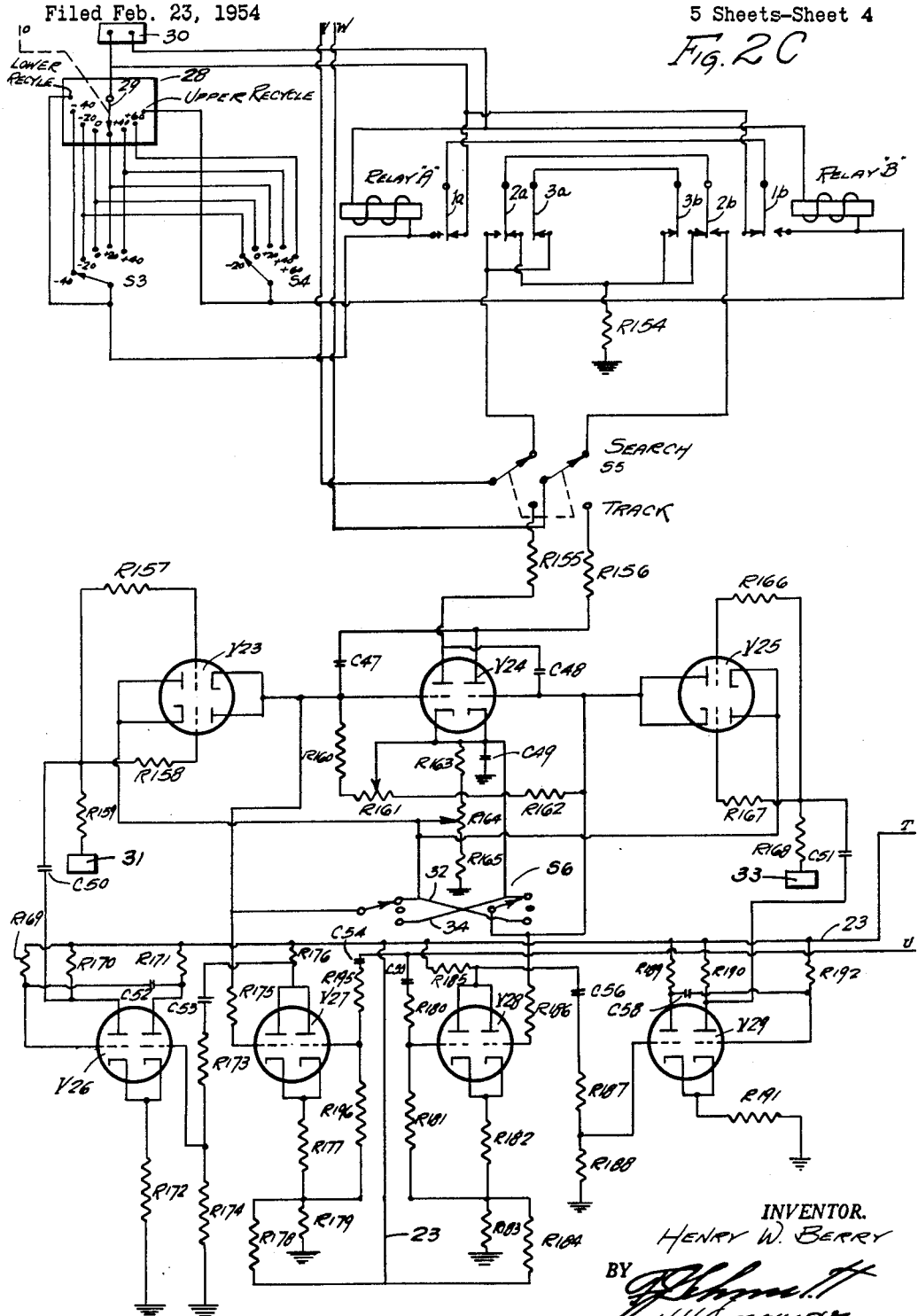
Figure 2C:
Figure 2D:
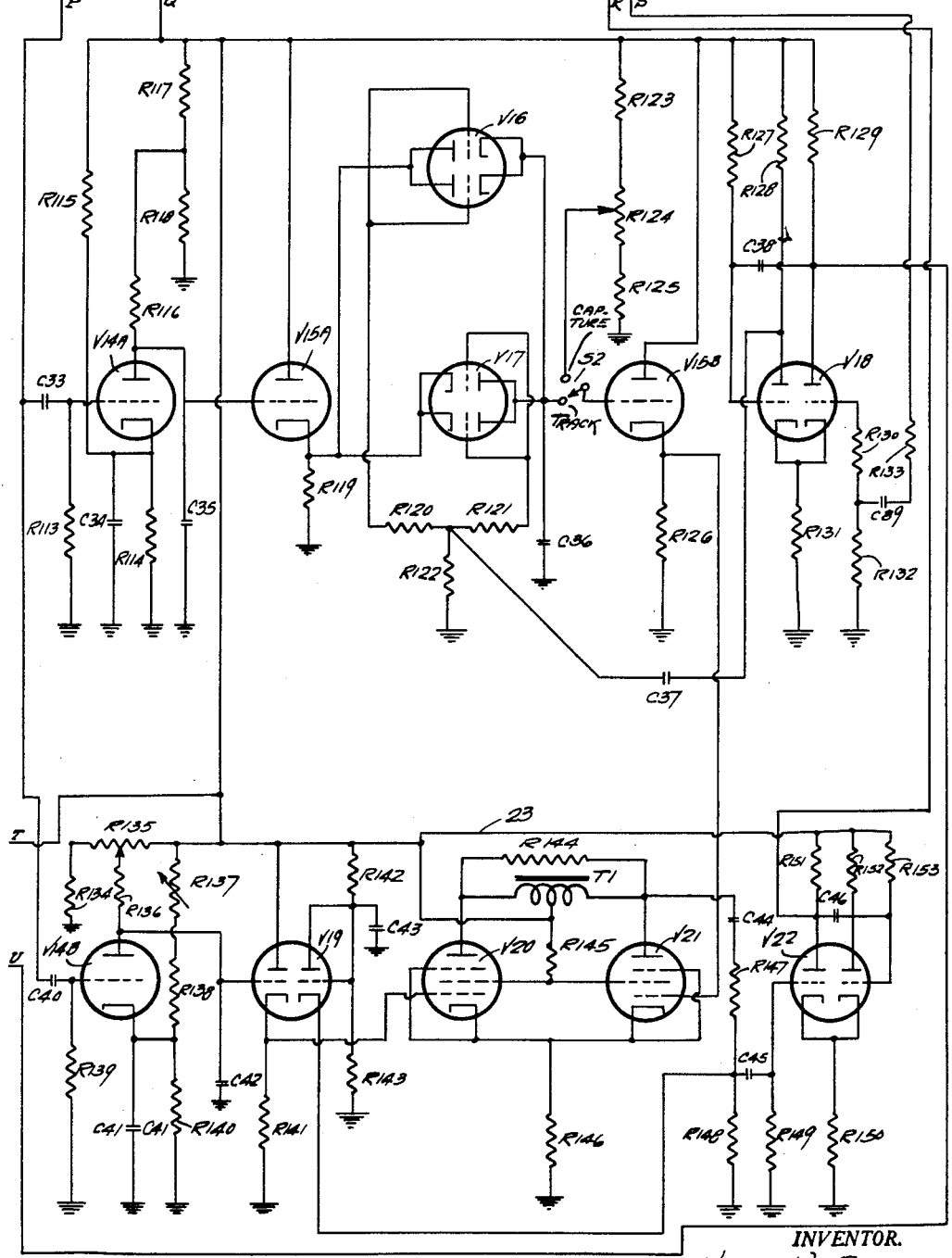

FIGURES 2A–2D provide a detailed circuit diagram of the preferred embodiment of the invention shown in FIGURE 1 when FIGURES 2A and 2B are placed horizontally side by side above FIGURES 2C and 2D.

FIGURES 3A–3F illustrate waveforms at various points in the apparatus shown in FIGURES 1 and 2.

Before proceeding with a more detailed description of the improved apparatus of the present invention, a brief functional explanation of the various component elements and circuits thereof as well as the manner in which they are operatively associated with one another will be given in order to aid in an understanding of the detailed description that is to follow As indicated heretofore, the apparatus with which the present invention is concerned is capable of performing two important operations. First, it searches out a particular target. Then it automatically tracks that target so as to continuously provide on the screen of a cathode ray tube information concerning the elevation and azimuth of the target.

Referring to the block diagram shown in FIGURE 1 of of the drawing the optical system or the like 3, which preferably includes two sets of optics mounted back to back such that each scans the region of interest on alternate halves of each spin cycle, is rotated at a constant rate about an axis perpendicular to the axis of the optical system. This rotation is generally called spinning and is obtained by means of the spin motor 4. In addition the axis of rotation is oscillated or tilted about an axis perpendicular to itself and to the optical axis. The rotation is continuous in the spin direction but is intermittent in the tilt direction in such a way that the optical axis rotates up and down in an elevational plane. The desired tilting motion is obtained by driving a tilting mechanism associated with the optical system 3 by means of the constant speed tilt motor 5 through the magnetic tilt clutch 6. During the searching operation the optical system is continuously tilted upwardly and downwardly between limits set by the operator whereas during the tracking operation it is tilted through a small angle which is symmetrical with respect to the angular position of the target being tracked.

The photoelectric cell 7 which is sensitive to infrared radiations is placed at the focal point of the optical system 3 and the output thereof is passed through the signal amplifier 8 and the gate 9 to the control grid of the oscilloscope 10. The output of the gate 9 drives the video pulse shaper 11 which in turn controls the magnetic tilt clutch 6 through the tilt tracking circuit 12 and switch S–5 when the same is actuated from its search position where it is connected to the tilt search circuit 13 to its track position. The spin tracking circuit 14 which is also controlled by the output of the video pulse shaper 11 is adapted to control the gate 9 during the tracking operation such that all signals to the signal amplifier except those in a very small area in the vicinity of the source being tracked are suppressed. The deflection circuits for the oscilloscope which produce an elliptical sweep on the deflection plates thereof and which include the two phase generator 15, the filters 16 and 17, the bridge rectifier 18, the tilt potentiometer 19, the vertical deflection amplifier 20, the synchronous electronic switch 21, and the horizontal deflection amplifier 22 will be described more fully hereinafter.

Referring now to FIGURES 2A through 2D of the drawing a more detailed description of the various component parts of the present invention will be given.

The signal amplifier

The photoelectric cell 7, which as indicated heretofore, is adapted to be energized by infrared light energy from the optical system, together with resistors R–1 and R–2 form a series circuit between the positive 280 volt line 23 and ground. The junction of the photocell and resistor R–2 is coupled to the grid of the cathode follower section of tube V–1 by means of condenser C–2 and resistors R–3, R–4, and R–6. Bypass condenser C–1 is preferably connected as shown between the junction of resistors R–1 and R–2 and ground. Similarly, condenser C–3 is preferably positioned as shown between the junction of resistors R–3 and R–4 and ground. The plate circuit of the cathode follower extends from the positive 280 volt line 23 through resistor R–9, the tube, and resistors R–5 and R–6 to ground. Condenser C–5 preferably couples the plate of the cathode follower to ground. The cathode of the cathode follower is connected to the grid of the amplifier section of V–1 through condenser C–4 and the grid is in turn tied to ground through resistor R–10. The plate circuit of the amplifier section of V–1 extends from the positive 280 volt line 23 through resistors R–9 and R–8, the tube, and resistor R–7 to ground. A shielded lead from the plate of the amplifier of V–1 is coupled to the grid of the amplifier section of V–2 through condenser C–6 and resistor R–11. The plate circuit of this amplifier section extends from the positive 280 volt line 23 through resistors R–13 and R–14, the tube, and resistor R–15 to ground. The plate of this amplifier is tied to the plate of the amplifier of tube V–1 by means of resistor R–12 and is also coupled to the grid of the cathode follower section of V–2 through condenser C–8. The plate circuit of the cathode follower section of V–2 extends from the positive 280 volt line 23 through resistor R–13, the tube and resistors R–16 and R–17 to ground. Resistor R–18 is preferably positioned as shown between the grid of the cathode follower and the junction of resistors R–16 and R–17 in the cathode circuit. The plate of the cathode follower is coupled to ground by condenser C–7 whereas its cathode is coupled to the grid input of the left hand amplifier section of tube V–3 by condenser C–9, potentiometer R–19, and resistor R–20. The plate circuit of this section of V–3 extends from the positive 280 volt line 23 through resistors R–21 and R–22, the tube, and resistor R–23 to ground. Condenser C–10 connects the junction of resistors R–21 and R–22 to ground. The plate of this section of V–3 is coupled to the grid of the right hand section of V–3 by condenser C–12, which grid is also coupled to ground by condenser C–14 and resistor R–27. The plate circuit of the right hand section of V–3 extends from the positive 280 volt line 23 through resistors R–24 and R–25, the tube, and resistor R–26 to ground. Condenser C–11 connects the junction of resistors R–24 and R–25 to ground. The plate of the right hand section of V–3 is coupled to the grid of the amplifying section of V–4 by condenser C–13 and resistor R–28. The plate circuit of this section of V–4 extends from the positive 280 volt line 23 through resistor R–30, the tube, and resistor R–29 to ground. The grid of the right hand gating section of tube V–4 is connected to ground through resistor R–31 and is also connected to the variable arm of switch S–1 which in its track position is connected to an open circuit and which in its search position is connected to the negative 53 volt line 24. The grid of the gating section of V–4 is also connected to the output of the video gate generator V–22 in a manner which will be more apparent hereinafter through resistor R–32 and condenser C–15. The plate of V–4 is coupled to the grid of the oscilloscope V–5 through condenser C–16 and as will be more apparent hereinafter thereby increases the potential on the control grid of the scope such that the screen of the oscilloscope is properly energized and/or illuminated.

In operation energization of the photoelectric cell 7 by means of infrared light energy from the optical system produces a variation in the flow of current from the positive 280 volt line 23 through resistors R–1 and R–2. The resultant fluctuation in potential at the junction of the cell and resistor R–2 is passed through condenser C–2 to the grid of the cathode follower section of tube V–1 which maintains the input impedance of the amplifier circuit of the right hand section of tube V–1 at a desired low value. The output of the cathode follower section of V–1 is then successively fed through the amplifier sections of V–1 and V–2, the cathode follower section of V–2 and the amplifier sections of V–3 to the grid of the amplifier circuit of V–4. This amplified signal is passed through the amplifier section of V–4 to the control grid of the oscilloscope V–5 depending on the condition of energization of the gating section of V–4. More specifically when switch S–1 occupies its track position the grid of the gate section is maintained substantially at ground potential so that it conducts heavily. In doing so the current through resistor R–29 maintains the cathode of the amplifier section at a relatively high positive potential such that signals impressed upon its grid are suppressed except when as will be more apparent hereinafter a signal from the generator V–22 removes and/or neutralizes the bias. When, however, switch S–1 occupies its search position, the negative 53 volt line 24 maintains the gate section of V–4 cutoff. In this way its amplifier section is conditioned to pass and amplify each signal that is delivered thereto. Accordingly, as will be more apparent hereinafter, each and every target signal that is transmitted through the receiver is recorded on the screen of the oscilloscope during the searching operation whereas depending on the energization of the gate of V–4 by tube V–22 only a preselected signal or signals are passed during the tracking operation.

*The vertical deflection circuit*

The two phase generator 15 which is mechanically connected to the spin motor 4 of the optical system generates in its output windings 15a and 15b a pair of quadrature sinewave voltages each of which is dependent upon and proportional to the rate at which the optical system is driven. The winding 15a of the generator delivers energy through the low pass filter 16 which includes resistors R–51 and R–52 and condensers C–22 and C–23 to the extremities of the balancing potentiometer R–53 and to the input of the bridge rectifier 18 which includes the crystal rectifiers CR–1, CR–2, CR–3, and CR–4. The output of the bridge rectifier is connected to the extremities of the tilt potentiometer 19 whereas the adjustable arm thereof, which is mechanically connected to the tilt control device 6 in a manner which will be described more fully hereinafter, is coupled through the potentiometer R–56 to the grid of the amplifier section of tube V–6. The plate circuit of this section of tube V–6 extends from the variable arm of potentiometer R–62 of the resistor divider network which also includes resistors R–61 and R–63 through the tube and the resistor R–57 to ground. Bypass condenser C–26 is preferably connected as shown in parallel with resistor R–57. The plate of the amplifier section of V–6 drives the grid of the cathode follower section of tube V–6, the plate circuit of which extends from the positive 400 volt supply line 25 through the tube and resistors R–59 and R–60 to the negative 53 volt supply line 24. Resistor R–58 is preferably positioned as shown between the grid and the cathode of the cathode follower whereas bypass condenser C–27 is preferably connected in parallel across resistor R–59. The output of the cathode follower is connected to the grid of the left hand amplifier section of tube V–7. The plate circuit of this section of tube V–7 extends from the positive 400 volt line 25 through resistor R–64, the tube, and resistor R–61 to the negative 53 volt line 24. The grid of the right hand amplifier section of tube V–7 is connected to the variable arm of potentiometer R–70 which together with resistors R–67, R–68, R–69, and R–71 form a resistor divider network between the positive 400 volt line 25 and the negative 53 volt line 24. The plate circuit of this section of tube V–7 extends from the positive 400 volt line 25 through resistor R–65, the tube and resistor R–61 to the negative 53 volt line 24. The plates of the amplifier sections of tube V–7 are respectively coupled to the vertical deflection plates of the oscilloscope 10. Thus as will be more apparent hereinafter the above described circuits deliver to the vertical deflection plates of the scope a rectified sinusoidal voltage, the frequency of which is proportional to the frequency of the tilt mechanism of the optical system.

Figure 3A:
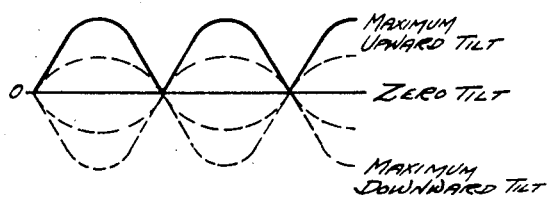
Figure 3B:
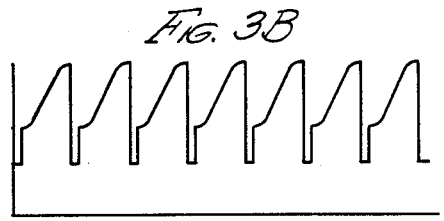
Figure 3C:
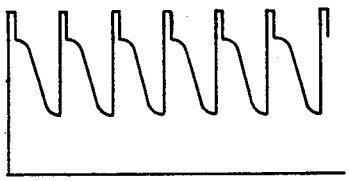

In operation the sine wave output of winding 15a of the generator 15 is filtered and passed through the bridge rectifier circuit 18. The push-pull outputs of the rectifier circuit drive the opposite ends of the tilt potentiometer 19 which is mechanically connected to the tilt axis of the optical system. The output of the tilt potentiometer, the waveform of which is shown in FIGURE 3A of the drawing, is then successively amplified and passed through the cathode follower section of tube V–6 and amplified and inverted by tube V-7. The push pull sine wave outputs of the amplifier and inverter sections of tube V-7 are then directly connected to the vertical deflection plates of the scope 10. As will be more apparent hereinafter, these sine wave outputs the amplitude of which follow the oscillations of the tilting mechanism together with the voltages which are impressed on the horizontal deflection plates provide a variable half-elliptical sweep pattern in which the minor axis continuously varies in accordance with the angular movement or tilt of the elevational searching and tracking mechanism.

*The horizontal deflection circuit*

The output of the low pass filter 16 is also coupled to the grid of the amplifier section of tube V-8 through resistor R-72. The plate circuit of this section extends from the junction of resistors R-75 and R-76, which form a resistor divider network between the positive 280 volt line 23 and ground, through the tube and resistor R-73 to ground. The plate of the amplifier section of tube V-8 is directly coupled to the grid of the cathode follower section of the tube. The plate circuit of the cathode follower section extends from the positive 280 volt line 23 through the tube and resistor R-73a to ground. Resistor R-74 is preferably connected as shown between the grid and the cathode of the cathode follower section of V-8.

The cathode of the cathode follower section of tube V-8 is also directly coupled to the grid of the left hand section of tube V-9 through resistor R-77. The plate circuit of this section of tube V-9 extends from the positive 280 volt line 23 through the tube and resistor R-78 to ground whereas the plate circuit for the right hand section of the tube extends from the positive 280 volt line 23 through resistor R-79, the tube, and resistor R-78 to ground. The grid of the right hand section of tube V-9 is connected to the variable arm of the potentiometer R-81 which together with resistors R-80 and R-82 form a resistor divider network between the positive 280 volt line 23 and ground. The output of tube V-9 is coupled to the grid of the left hand section of the inverter V-10 by means of the condenser C-28 and the series resistors R-83 and R-87. The plate circuit of this section of tube V-10 extends from the positive 280 volt line 23 through resistor R-84, the tube, and resistors R-86 and R-87 to ground. The junction of resistors R-86 and R-87 is coupled to the gating section of tube V-12 through condenser C-29 and resistor R-99 whereas the plate of the inverter is coupled to the grid of the gating section of tube V-11 by means of the condenser C-30 and the resistor R-91. The plates of the gating sections of tubes V-11 and V-12 are directly connected to the positive 280 volt line 23 whereas the cathodes thereof are connected to the respective cathodes of the amplifier sections of tubes V-11 and V-12 and to ground through resistors R-92 and R-98. The plates of the amplifier sections are coupled together by means of the balancing potentiometer R-96, the variable arm of which is connected to the positive 280 volt line through resistor R-97 whereas the grids thereof are connected to one another by means of the potentiometer R-95. The grids of the amplifier sections of tubes V-11 and V-12 are also coupled to winding 15b of the two phase generator 15 through the low pass filter 17 which includes resistors R-54 and R-55 and condensers C-24 and C-25.

The variable arm of potentiometer R-96 is also coupled to the grid of left hand section of amplifier V-13 by means of condenser C-32 and potentiometer R-100. The plate circuits of both sections of amplifier V-13 extend from the positive 400 volt line 25 respectively through resistors R-101 and R-102, the tube, and resistor R-103 to the negative 53 volt line 24. The grid of the right hand section of amplifier V-13 is connected to the variable arm of potentiometer R-107 which together with resistors R-104, R-105, R-106, and R-108 form a resistor divider network between the positive 400 volt line 25 and the negative 53 volt line 24. The plates of amplifier V-13 are directly connected to the respective horizontal deflection plates of the oscilloscope 10.

In operation the sinewave of winding 15a of generator 15 is fed from the output of the filter network 16 successively through the direct coupled amplifier and cathode follower sections of tube V-8 to the grid input of the clipper or limiter circuit of tube V-9. Direct coupling is used in these amplifier and clipper circuits in order to eliminate the large coupling capacitors that would be necessary if capacity coupling were used. In the clipper circuit successive positive excursions of the sine wave voltage at the grid input of tube V-9 produce proportional increases of potential in the common cathode circuit of the tube. When the potential at the cathode of the right hand section of tube V-9 sufficiently exceeds the potential of its grid which is maintained at a preselected value determined by the position of the variable arm of potentiometer R-81, this section of the tube cuts off thereby producing at its plate the square wave voltage. This square wave voltage is then fed through the coupling condenser C-28 to the left hand section of the inverter tube V-10. The plate and cathode circuits of inverter V-10 which are respectively coupled in push-pull to the gating sections of tubes V-11 and V-12 by condensers C-30 and C-29 alternately block or gate the amplifier sections of tubes V-11 and V-12 which are driven by the sinewave output voltage of winding 15b of generator 15. More specifically, when the gating sections of tubes V-11 and V-12 conduct during the positive halves of the square wave output of inverter V-10, plate current in resistors R-92 or R-98 produces a sufficient bias at the cathode of the corresponding amplifier section of the tube to cut it off so that energization of its grid is prevented. When, however, the gating sections of tubes V-11 and V-12 are biased to cut-off during the negative halves of the square wave output of V-10, the amplifier sections of V-11 and V-12 are conditioned to receive, amplify and pass on the sinusoidal voltage from winding 15b of the generator at the grid of V-11 and V-12. Accordingly, a voltage which has the waveform shown in FIGURE 3B of the drawing appears at the variable arm of potentiometer R-96 in the plate circuits of tubes V-11 and V-12. This waveform consists of half sine waves which run from a negative peak to an adjacent positive peak and then quickly return to the negative peak to repeat the cycle. The tail at the end of each return or fly-back portion of the wave is produced due to the fact that both of the amplifier sections conduct at the same time during a short interval of the switching operation. The output of tubes V-11 and V-12 is then fed through condenser C-32 to the amplifier and inverter V-13 which produces the output waveforms shown in FIGURES 3C and 3D of the drawing. These waveforms in turn drive the horizontal deflection plates of the oscilloscope 10 and together with the sinewave voltages impressed upon the vertical deflection plates thereof produce the desired elliptical sweep, the minor axis of which continuously varies in accordance with the movement of the tilting mechanism from reference angular elevation.

*Cathode ray tube circuits*

Inasmuch as the cathode ray tube circuit which is employed in the present invention could take a number of different forms and inasmuch as the specific details thereof form no part of the present invention a full description of the same is omitted for the sake of simplicity. In general, however, the circuit which is disclosed in the drawing is adapted to maintain a 2000 volt potential on the anode and a 4000 volt potential on the accelerator.

These operating voltages are supplied by the voltage doubler power supply 27 which preferably includes a pair of selenium rectifiers that feed suitable resistance capacitance filters. The focus control 28a is preferably adjusted to provide the smallest diameter spot whereas the astigmatism control 29a permits the potential of the anode to be adjusted equal to the average potential of the deflection plates. In this way a uniform focus is obtained on all parts of the screen. As will be more apparent hereinafter under normal operating conditions the cathode ray tube is biased beyond cutoff so that a majority of the noise pulses that are passed by the signal amplifier fail to cause a visible trace on the screen.

*The tilt search circuit*

Switches S-3 and S-4, relays A and B, the tilt commutator 28 and the magnetic clutch 6 embody the apparatus of the tilt search circuit of the present invention. Relays A and B which are substantially identical and which are of a type that have no built-in delay slugs have three sets of contacts. Two of these sets are single pole double throw whereas the other set is single pole single throw and is closed when its associated pick up coil is not energized.

The tilt commutator 28 includes a brush element 29, which is mechanically coupled or ganged with the optical system 3, and a plurality of narrow commutator segments with which the brush element makes momentary contact as it oscillates in step with the optical system. As shown in the drawing these commutator elements are preferably positioned at 20° intervals with respect to one another. Contacts from —40° to +40° inclusive are connected to the corresponding points of the lower limit switch S-3 whereas sections between —20° and +60° are connected to the corresponding points of the upper limit switch S-4. The movable arm of switch S-3 is connected to one terminal of the energizing coil of relay A and to the front contact of its armature 1a whereas the movable arm of switch S-4 is connected to the corresponding terminal of the energizing coil of relay B and to the front contact of its armature 1b. The opposite extremity of each relay is connected directly to one terminal of the relay supply source 30.

The other terminal of the relay supply source 30 is connected to the movable arm or brush 29 of the tilt commutator, and to the back contacts of the armatures 1a and 1b of relays A and B. The back contacts of armatures 2a, 2b and 3b are connected to ground through resistor R-154.

The movable arms of switch S-5 which are mechanically interlocked or ganged together are respectively connected to the positive 280 volt line 23 through the "up" and "down" clutch windings 6a and 6b of the magnetic clutch 6. In their search positions the movable arms of switch S-5 are connected to front contact of armature 2b of relay B and to the front contact of armature 2a and the back contact of armature 3a of relay A. When the movable arms of switch S-5 occupy their lower positions, the "up" and "down" winding of the magnetic clutch are energized by the tilt tracking circuits which will be described more fully hereinafter.

During the searching operation armatures 1a and 1b of relays A and B operate in a "lock up" and "release" circuit whereby either relay A or relay B when it receives a pulse from the source 30 through the commutator 28 and the limit switch S-3 or S-4 immediately locks-up and also simultaneously releases the other relay. Armatures 2a and 2b of relays A and B select the clutch winding which is to be energized, and, due to the manner in which they are electrically interconnected, prevent an energization of both clutches simultaneously. The so called "start up" armatures 3a and 3b of relays A and B permit the apparatus to properly commence the tilting operation. More specifically, when the circuit is first turned on and when neither relay A nor relay B is energized, the "up" winding 6a of the magnetic clutch is energized by a circuit that extends from the positive 280 volt line 23 through clutch winding 6a the armature of switch S-5, armature 3a of relay A, armature 3b of relay B, and resistor R-154 to ground. After the brush element 29 of the commutator reaches an upper limit determined by the setting of switch S-4 or the upper recycle limit contact, relay B is energized, the "start up" cycle ends and the tilting circuit commences normal operation. During normal operation since either one or the other relay is energized, the "start up" circuit is then rendered inoperative.

The upper and lower recycle contacts of the tilting commutator device prevent damage to the equipment when, during operation, the limit controls are moved such that the tilting mechanism is positioned outside the tilt limits. Accordingly, when either recycle limit contact is reached, the circuit will immediately reverse itself and search for the new tilt range and remain therewithin once it has been reached.

In operation the tilting mechanism operates in accordance with the settings of the upper and lower limit switches S-3 and S-4. In the drawing S-3 is shown set at —40° and S-4 is shown at —20° whereas the brush element of the commutator is positioned on the +20° contact. Accordingly, if the circuit were energized at this point, neither relay A nor B would be energized and due to the above described start up circuit the mechanism would begin tilting upward. Since the mechanism is outside the —40° and —20° limits set by switches S-3 and S-4, it would tilt upwardly until the brush element 29 engaged the upper recycle contact. When this occurs relay B would be energized by a circuit which extends from relay supply source 30 through the relay and the upper recycle contact back to the other relay supply source. Relay B would also be locked in its energized position by a stick circuit which includes the front contact of armature 1b of relay B and the back contact of armature 1a of relay A. When relay B becomes energized power would be transferred from the "up" winding 6a of the magnetic clutch to its "down" winding 6b. The energizing circuit for the "down" winding extends from the positive 280 volt line 23 through winding 6b, switch S-5, the front contact of armature 2b of relay B, the back contact of armature 2a of relay A, and resistor R-154 to ground. Accordingly, the mechanism would then start tilting downward. As the brush element of the commutator passes through the —20° position a momentary connection would be established through switch S-4 to relay B. Since, however, relay B is already picked up and locked, this would not affect the tilting operation and the mechanism would continue tilting downward until the brush element reaches the —40° contact. When this occurs, relay A is energized by a circuit that extends from the relay supply source 30, through relay a, switch S-3, the —40° contact of the commutator, back to the other relay supply source. When relay A picks up and locks it simultaneously opens the stick circuit for relay B. In this way power is transferred from the "down" winding of the clutch to its "up" winding and the mechanism would start tilting upward again. This would continue until the brush element 29 reaches the —20° contact when relay B would be energized so as to transfer power back to the "down" winding of the clutch and repeat the cycle. Accordingly, the optical system would continue to tilt upwards and downwards between —20° and —40° until the power to the mechanism is removed or until the upper or lower limit thereof is changed.

*The tilt tracking circuit*

When the tilt control switch S-5 is actuated from the search to the track position, the tilting mechanism of the optical system is controlled by the tilt tracking circuit which includes tube V–18 and tubes V–23 through V–29 and their associated circuits. The grid of the right hand section of tube V–18 is coupled to the output of the above described signal amplifier through condenser C–39 and resistors R–133, R–132, and R–130. The plate circuit of this section of tube V–18 extends from the positive 280 volt line 23 through resistor R–129, the tube, and resistor R–131 to ground. The plate of tube V–18 is coupled to the grids of the gating sections of tubes V–27 and V–28 respectively through condenser C–54 and resistor R–195 and through condenser C–55 and resistor R–180. The plate circuit of V–27 extends from the positive 280 volt line 23 through resistor R–176, the tube, and resistor R–177 to the junction of resistors R–178 and R–179 in the resistor divider network between the positive 280 volt line 23 and ground. Similarly, the plate circuit of V–28 extends from the positive 280 volt line 23 through resistor R–185, the tube, and resistor R–182 to the junction of resistors R–183 and R–184 in the resistor divider network between line 23 and ground. The junction of the resistors in each of the resistor divider networks is also respectively tied to the grids of tubes V–27 and V–28 by resistors R–196 and R–181.

The plate of tube V–27 is coupled to the grid of the right hand section of the one shot multivibrator V–26 through condenser C–53 and resistors R–173 and R–174. The plate circuit of this section of the multivibrator extends from the positive 280 volt line 23 through resistor R–171, the tube and resistor R–172 to ground. The plate circuit of the left hand section of V–26 extends from the positive 280 volt line 23 through resistor R–170, the tube and resistor R–172 to ground. The grid of the left hand section of V–26 is coupled to the plate of the right hand section through condenser C–52 and to the positive 280 volt line 23 through resistor R–169. The plate of the left hand section of V–26 is coupled to the grids of the parallel sections of clamp V–23 through condenser C–50 and resistors R–157 and R–158. The junction of condenser C–50 with resistors R–157 and R–158 is also connected as shown to the negative clamping bias source 31 through resistor R–159. The cathode of the upper section of clamp V–23 and the plate of its lower section are tied together and are connected to the grid of the left hand section of the multivibrator V–24. The plate of the upper section of clamp V–23 and the cathode of its lower section are also tied together and are connected to the variable arm of the clamp level resistor R–164 and to the jumper 32 of the override switch S–6.

The plate of tube V–28 is coupled to the grid of the left hand section of the one shot multivibrator V–29 through condenser C–56 and resistors R–187 and R–188. The plate circuit of this section of the multivibrator extends from the positive 280 volt line 23 through resistor R–189, the tube, and resistor R–191 to ground. The plate circuit of the right hand section of V–29 extends from the positive 280 volt line 23 through resistor R–190, the tube and resistor R–191 to ground. The grid of the right hand section of V–29 is coupled to the plate of the left hand section through condenser C–58 and to the positive 280 volt line 23 through resistor R–192. The plate of the right hand section of V–29 is coupled to the grids of the parallel sections of clamp V–25 through condenser C–51 and resistors R–166 and R–167. The junction of condenser C–51 with resistors R–166 and R–167 is also connected as shown to the negative clamping bias 33 through resistor R–168. The plate of the upper section of clamp V–25 and the cathode of its lower section are tied together and are connected to the grid of the right hand section of the multivibrator V–24. The cathode of the upper section of clamp V–25 and the plate of its lower section are also tied together and are connected to the variable arm of the clamp level resistor R–164 and to the jumper 32 of the override switch S–6.

The plate circuits of the left and right hand sections of multivibrator V–24 extend respectively from the positive 280 volt line 23 through windings 6a and 6b of the clutch, through resistors R–155 and R–156, through the tube and through resistors R–163 and R–165 and potentiometer R–164 to ground. The plate of the left hand section of V–24 is coupled to the grid of its right hand section through condenser C–48 whereas the plate of the right hand sectiton of V–24 is coupled to the grid of its left hand section through condenser C–47. The grids of the multivibrator V–24 are also coupled to the grids of the gating sections of tubes V–27 and V–28 respectively through resistors R–175 and R–186, to one another through resistors R–160 and R–162 and potentiometer R–161, and to the movable arms of the override switch S–6. The cathodes of the multivibrator V–24 is preferably coupled to ground through condenser C–49 and to the jumper 34 of switch S–6.

Figure 3E:
Figure 3D:
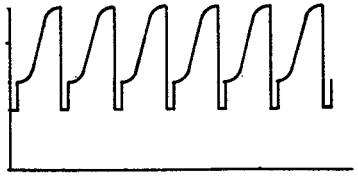
Figure 3F:
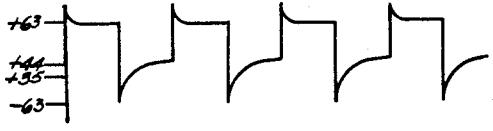

In operation the optical system continues to tilt symmetrically about the last known position of the target being tracked until a new target signal is received, the clutch windings being alternately energized by the plate currents of the multivibrator V–24. The voltage waveforms at the grids of V–24 are typical of those of a conventional multivibrator and are shown in FIGURES 3E and 3F of the drawing. As shown therein the cutoff potential of both sections of V–24 is set at +44 volts so that the curved portion of the waveform which is caused by the discharge of condensers C–47+C–48 through resistors R–160 and R–162 lies below cutoff. Since +35 corresponds to the midpoint of the discharge time of condensers C–47+C48, by instantaneously forcing the grid potential of V–24 to +35 volts when a target signal is received and by then allowing condensers C–47 and C–48 to discharge from that point upwardly to the cutoff potential, the multivibrator flips over after a predetermined interval. In this way the tilting mechanism is permitted to travel a predetermined amount beyond the point at which the target pulse is received.

The circuits which are employed to fix the grid potential at +35 volts whenever a target pulse is received include the clamps V–23 and V–25 and tubes V–18 and V–26 through V–29. When a target pulse is received at the output of the signal amplifier, it is first passed through the pulse shaping circuit which includes tube V–18 and then delivered to the grids of the amplifier sections of tubes V–27 and V–28. Depending on which half of the multivibrator is conducting current and on the potential at which its respective grid is, one or the other of the gating sections of tubes V–27 and V–28 will cutoff and/or suppress the target signal on the grid of its corresponding amplifier section. Accordingly, if at the time the target signal is received the left hand section of the multivibrator V–24 is conducting its grid will be at a potential sufficiently above cutoff to cause the gating section of V–27 to conduct. The plate current of this section of V–27 through the common cathode resistors R–177 and R–179 will bias the amplifier section of V–27 so that the target signal on its grid will have no effect. However, since the right hand section of V–24 will then be cutoff and since its grid will be at a potential below cutoff, the gating section of V–28 will also be cutoff, thereby conditioning the amplifier section of the tube to receive and pass a target signal. Thus, when the target signal is received and passed through the amplifier to fire the conventional shaping one shot multivibrator circuit of tube V–29. The output of tube V–29 which is a positive pulse having an amplitude of about 200 volts is then delivered through condenser C–51 and resistors R–166 and R–167 to the grids of clamp V–25 which is normally biased to cutoff by the clamp bias supply 33. When this occurs, the conventional clamp is rendered operative to immediately place a +35 volt potential on the grid of the right hand section of V–24. Thereafter, as has been indicated heretofore, the grid of this section of V–24 rises exponentially in a predetermined period of time to its firing point at which time V–24 fires and current is transferred from winding 6a to winding 6b of the clutch and the tilting mechanism is reversed.

Inasmuch as the gating and amplifier sections of V-27, the multivibrator V-26 and the clamp V-23 operate in a manner similar to the above described circuits on alternate half cycles of the multivibrator V-24, a detailed description of the same is deemed neither necessary nor expedient.

The spin tracking circuit

Tubes V-14A, V-14B, V-15A, V-15B, and V-16 through V-22 inclusive together with their associated circuits embody the spin tracking circuit of the present invention. The grid of tube V-14A is coupled to the output inverter V-10 through condenser C-33 and resistor R-113. The plate circuit of V-14A extends from the positive 280 volt line 23 through resistor R-117 which together with resistor R-118 forms a resistor divider network between the 280 volt line and ground, resistor R-116, the tube and resistor R-114 to ground. The cathode of V-14A is also coupled to ground through condenser C-34 and to the positive 280 volt line 23 through resistor R-115. Condenser C-35 which is connected between the plate of V-14A and ground is also connected to the grid of cathode follower V-15A. The plate circuit of V-15A extends from the positive 280 volt line 23 through the tube and resistor R-119 to ground. The cathode of V-15A is directly connected to the paralled plates of clamp V-16 and the paralleled cathodes of clamp V-17. The paralleled cathodes of V-16 and the paralleled plates of V-17 are connected together and are also connected to ground through condenser C-36 and to the grid of cathode follower V-15B through the track position of switch S-2. The plate circuit of V-15B extends from the positive 280 volt line 23 through the tube and resistor R-126 to ground. The capture position of switch S-2 is connected to the variable arm of potentiometer R-124 which together with resistors R-123 and R-125 form a resistor divider network that extends from the positive 280 volt line 23 to ground. The paralleled grids of V-16 are coupled to ground through resistors R-120 and R-122 and the paralleled grids of V-17 are coupled to ground through resistors R-121 and R-122. The junction of resistors R-120, R-121, and R-122 is driven by the output of the left hand section of the pulse shaper V-18 through condenser C-37. The plate circuit of this section of V-18 extends from the positive 280 volt line 23 through resistor R-128, the tube, and resistor R-131 to ground. The grid of the left hand section of V-18 which is connected to the positive 280 volt line 23 through resistor R-127 is coupled to the plate of the right hand section of V-18, through condenser C-38 and is driven thereby in a manner which will be more apparent hereinafter.

The output of inverter V-10 is also coupled to the grid of V-14B through condenser C-40 and resistor R-139. The plate circuit of V-14B extends from the positive 280 volt line 23 through potentiometer R-135, which together with resistor R-134 forms a resistor divider network between the 280 volt line and ground, through resistor R-136 and through the tube and resistor R-140 to ground. Bypass condenser C-41 preferably couples the cathode of V-14B to ground as shown whereas resistor R-138 and potentiometer R-137 tie the cathode to the 280 volt line. Condenser C-42 which is connected between the plate of V-14B and ground is also connected to the grid of the cathode follower section of V-19. The plate circuit of this section extends from the positive 280 volt line 23 through the tube and resistor R-141 to ground. The cathode of V-19 is tied to the control grid of tube V-20 which together with tube V-21 embody a comparison circuit. The cathodes and suppressor grids of tubes V-20 and V-21 are connected together and are also connected to ground through resistor R-146. The plates of tubes V-20 and V-21 are connected together through the parallel arrangement of resistor R-144 and the saturable reactor T-1. The center tap of the saturable reactor is connected to the positive 280 volt line 23 and to the screen grids of tubes V-20 and V-21 through resistor R-145.

The output of tube V-21 and the comparison circuit is coupled to the grid of the left hand section of tube V-22 through condensers C-44 and C-45 and resistors R-147, R-148 and R-149. The junction of resistors R-147 and R-148 is also connected to the cathode of the clamping section of V-19 the plate and grid of which are coupled to ground through condenser C-43 and resistor R-143 and to the positive 280 volt line 23 through resistor R-142. The plate circuit of the left section of V-22 extends from the positive 280 volt line 23 through resistor R-151, the tube, and resistor R-150 to ground. The plate of this section of V-22 drives the grid of gate V-4 in a manner which has been described more fully heretofore and also the grid of the right section of V-22 through condenser C-46. The plate circuit of this section of V-22 extends from the positive 280 volt line 23 through resistor R-152, the tube, and resistor R-150 to ground.

In operation the spin tracking circuit is arranged to deliver a high voltage pulse to the V-4 gate circuit and the accelerating grid of the oscilloscope immediately prior to the receipt of a selected target pulse. In order to accomplish this a substantially linear sawtooth wave is generated by allowing condenser C-35 to charge from the positive 280 volt line 23 through resistors R-116, R-117, and R-118 and by subsequently quickly discharging the condenser through tube V-14A at the beginning of each spin cycle. Accordingly the flyback pulse at the arm of the D.C. balance potentiometer R-96 is fed through the amplifier section of tube V-10 and is used to trigger tube V-14A at the beginning of each spin cycle. This pulse is fed to the grid of the right hand section of tube V-10 where it is clipped and inverted. The output of V-10 is taken from the plate circuit at the junction of its plate with plate resistor R-85 and fed through condenser C-33 to the grid of V-14A. When this occurs, tube V-14A conducts heavily and quickly discharges condenser C-35. During the remainder of the spin cycle V-14A is held cutoff by the drop in potential across resistor R-114 due to the flow of current from the 280 volt supply through resistor R-115. The bypass condenser C-34 across resistor R-114 holds the cathode voltage of V-14A substantially constant and thereby establishes the potential across condenser C-35 at the beginning of each sawtooth. The cathode follower V-15A which conducts in accordance with the instantaneous charge collected on condenser C-35, provides a low impedance output for the sawtooth generating circuit.

The output of cathode follower V-15A is then fed through the parallel clamps V-16 and V-17 to control the potential across condenser C-36. Since, however, the grids of clamps V-16 and V-17 are normally maintained at ground potential, the tubes V-16 and V-17 remain cutoff until a target pulse is transmitted through the signal receiver and through video pulse shaper tube V-18 to the junction of resistors R-120, R-121, and R-122. Therefore, the potential across condenser C-36 will remain substantially constant until the clamps are energized at which time condenser C-36 is quickly brought to the potential of the cathode of V-15A. In this way the voltage across condenser C-36 and therefore the output of cathode follower V-15B which is driven thereby is maintained proportional to the angular position or spin of the last target pulse that was transmitted through the signal amplifier. Moreover, if on successive spins the spin angle of the target changes, the voltage across condenser C-36 and consequently the output of cathode follower V-15B will be changed a corresponding amount.

The flyback pulse at the arm of the D.C. balance potentiometer R-96 is also used to trigger tube V-14B at the beginning of each spin cycle. Accordingly, this pulse is fed through the inverter section of V-10 and condenser C-40 to the grid of V-14B. When this occurs, tube V-14B conducts heavily thereby quickly discharging condenser C-42. During the remainder of the spin cycle V-14B is held cutoff by the drop in potential across resistor R-140 and a sawtooth wave similar to that which is formed across condenser C-35 is produced across condenser C-42. By properly adjusting potentiometer R-137, however, this sawtooth voltage is displaced from the one previously described by a few volts. The sawtooth voltage across condenser C-42 is then fed through the cathode follower V-19 to the control grid of V-20 which together with V-21 forms a part of the comparison circuit is designed such that a very small portion of plate current through either V-20 or V-21 is sufficient to saturate its core. Accordingly, reactor T-1 is saturated at all times except when the grid voltage of V-20 is substantially equal to the grid voltage of V-21 and the plate currents of tubes V-20 and V-21 through opposite ends of the reactor neutralize one another. Inasmuch as a substantially constant D.C. potential which is proportional to the spin position of the target is maintained on the control grid of tube V-21, the current in its plate circuit which passes through the right half of reactor T-1 is sufficient to saturate the core thereof until the sawtooth potential on the control grid of V-20 approaches the magnitude of the potential on the control grid of V-21. When this occurs, the effective flux through reactor will be suddenly collapsed and/or reversed so as to produce a sharp voltage pulse at the plate of V-21. This pulse is then clipped and clamped by the right half of tube V-19 and is passed through the video gate generator V-22 to the grid of the right half of V-4 which as has been described more fully heretofore conditions the amplifier section of V-4 to energize the accelerating grid of the oscilloscope. Accordingly, since the sawtooth wave which is applied to the grid of V-20 is displaced a predetermined small amount ahead of the spin position of the target, the video gate generator V-22, tube V-4 and the accelerating gate of the oscilloscope are energized sufficiently ahead of the last position of the target to continuously track the same.

Obviously, many modifications and variations of the present invention are possible in the light of the above teachings. It is therefore to be understood that within the scope of the appended claims the invention may be practiced otherwise than as specifically described.

What is claimed is:

1. A tilt search circuit for an infrared energy scanning and detecting system comprising an optical device; a tilt motor; a magnetic clutch including a first winding for tilting the optical device in one direction and a second winding for tilting the device in the opposite direction; a tilt commutator having a movable brush element which is operatively connected to the optical device and a plurality of contacts which are successively engaged by the brush element as it oscillates with the optical device; a manually operated lower limit switch having a rotary arm and a plurality of contacts which are electrically connected to a predetermined number of the contacts of the commutator adjacent one extremity thereof; a manually operated upper limit switch having a rotary arm and a plurality of contacts which are electrically connected to a predetermined number of the contacts of the commutator adjacent the opposite extremity thereof; a first and a second relay; an energizing circuit for the first relay which is completed when the brush element of the commutator engages the contact thereof which is connected to the manually selected contact of the lower limit switch; an energizing circuit for the second relay which is completed when the brush element of the commutator engages the contact thereof which is connected to the manually selected contact of the upper limit switch; means for energizing the first winding of the magnetic clutch when the first relay is energized; and means for energizing the second winding of the clutch when the second relay is energized.

2. A tilt search circuit for an infrared energy scanning and detecting system comprising an optical device; a tilt motor; a magnetic clutch including a first winding for tilting the optical device in one direction and a second winding for tilting the device in the opposite direction; a tilt commutator having a movable brush element which is operatively connected to the optical device and a plurality of contacts which are successively engaged by the brush element as it oscillates with the optical device; a manually operated lower limit switch having a rotary arm and a plurality of contacts which are electrically connected to a predetermined number of the contacts of the commutator adjacent one extremity thereof; a manually operated upper limit switch having a rotary arm and a plurality of contacts which are electrically connected to a predetermined number of the contacts of the commutator adjacent the opposite extremity thereof; a first and a second relay; an energizing circuit for the first relay which is completed when the brush element of the commutator engages the contact thereof which is connected to the manually selected contact of the lower limit switch; an energizing circuit for the second relay which is completed when the brush element of the commutator engages the contact thereof which is connected to the manully selected contact of the upper limit switch; stick circuits for the first and second relays for maintaining each energized until the energizing circuit for the other is completed; means for energizing the first winding of the magnetic clutch when the first relay is energized; and means for energizing the second winding of the clutch when the second relay is energized.

3. A tilt tracking circuit for an infrared energy scanning and detecting system comprising an optical device; a tilt motor; a magnetic clutch including a first winding for tilting the optical device in one direction and a second winding for tilting the device in the opposite direction; a multivibrator circuit which continuously and alternately energizes the said first and second windings of the clutch; and a clamping circuit which is energized by a target signal and which triggers the multivibrator circuit a predetermined interval after the receipt of the target signal and thereby causes the optical device to tilt symmetrically about the recorded position of the target.

4. A tilt tracking circuit for an infrared energy scanning and detecting system comprising an optical device; a tilt motor; a magnetic clutch including a first winding for tilting the optical device in one direction and a second winding for tilting the device in the opposite direction; a multivibrator circuit which continuously and alternately energizes the said first and second windings of the clutch; a clamping circuit for each half of the multivibrator circuit; and means for selectively energizing the clamping circuit that is associated with the non-conduction half of the multivibrator circuit a predetermined interval after the receipt of a target signal.

5. A spin tracking circuit for an infrared energy scanning and detecting system comprising an optical device; a spin motor which is arranged to continuously rotate the optical device at a predetermined constant rate about an axis that is substantially at right angles with the optical axis of the device; means for deriving a direct current voltage which is substantially proportional to the angular position of the optical device when the optical axis thereof becomes aligned with a preselected target; a sawtooth generator which initiates a new pulse at the beginning of each spin cycle of the optical device; means for controlling the sawtooth generator such that the linearly increasing voltage of each pulse thereof will become substantially equal to the said direct current voltage a predetermined interval before the last known position of the target is reached; and a circuit which is controlled by the said direct current voltage and the said linearly increasing voltage and which energizes a target detection circuit when the said voltages become substantially equal.

6. A spin tracking circuit for an infrared energy scanning and detecting system comprising an optical device; a spin motor which continuously rotates the optical device at a predetermined constant rate about an axis that is substantially at right angles with the optical axis of the device; a sinewave generator which is connected to and driven by the motor, each cycle of the sinewave generator being initiated at the beginning of each spin cycle of the rotating optical device; a first sawtooth generator which generates a new pulse at the beginning of each cycle of the sinewave generator; means controlled by the said sawtooth generator for deriving a direct current voltage which is substantially proportional to the angular position of the optical device when the optical axis thereof becomes aligned with a preselected target; a second sawtooth generator which generates a pulse having substantially the same shape as the pulse generated by the first sawtooth generator but displaced ahead thereof in time a predetermined amount; and a comparison circuit which is controlled by the said direct current voltage of the first sawtooth generator and the linearly increasing voltage output of the second sawtooth generator and which energizes a target detection circuit when the said voltages become substantially equal.

7. In an infrared energy scanning and detecting system a sweep circuit for the horizontal and vertical deflection plates of an oscilloscope comprising an optical device; a spin motor which continuously rotates the optical device at a predetermined constant rate about a vertical spin axis; a tilt mechanism which is arranged to oscillate the spin axis of the optical device in a predetermined manner; a two phase generator which is operatively connected to the spin motor and which generates a pair of sinewave voltages; means for rectifying one of the sinewave voltages and for modulating it in accordance with the oscillatory frequency of the tilting mechanism; means for driving the vertical plates of the oscilloscope with the modulating component of the modulated wave; and means for driving the horizontal plates of the oscilloscope in accordance with the other of the sinewave voltages of the generator.

8. In an infrared energy scanning and detecting system a sweep circuit for the horizontal and vertical deflection plates of an oscilloscope comprising an optical device; a spin motor which continuously rotates the optical device at a predetermined constant rate about a vertical spin axis that is substantially at right angles to the optical axis of the device; a tilt mechanism which is adapted to oscillate the spin axis of the device in a plane and about a point which are respectively defined by the position and junction of the optical and spin axes of the device; a two phase generator which is operatively connected to the spin motor and which generates a pair of quadrature sinewave voltages; a bridge rectifier which rectifies one of the sinewave voltages; a potentiometer connected across the output terminals of the bridge rectifier having a variable arm which is operatively connected to and driven by the tilting mechanism such that the rectified sinewave voltage is amplitude modulated in accordance with the oscillatory frequency of the tilting mechanism; circuit means for coupling the output of the potentiometer to the vertical plates of the oscilloscope; and means for driving the horizontal plates of the oscilloscope in accordance with the other of the sinewave voltages of the two phase generator.

References Cited in the file of this patent

UNITED STATES PATENTS

| | | |
|---|---|---|
| 2,211,377 | Langgasser et al. | Aug. 13, 1940 |
| 2,595,190 | Edwards | Apr. 29, 1952 |